(12) United States Patent
Boone (10) Patent No.: US 8,192,574 B1
(45) Date of Patent: Jun. 5, 2012

(54) PROCESS FOR BONDING A VENTED HOLLOW COMPONENT

(75) Inventor: Richard Boone, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 12/829,234

(22) Filed: Jul. 1, 2010

Related U.S. Application Data (63) Continuation of application No. 12/779,762, filed on May 13, 2010, now abandoned.

(51) Int. Cl.
| | |
|---|---|
| B29C 65/00 | (2006.01) |
| B29C 53/80 | (2006.01) |
| B29C 53/58 | (2006.01) |
| B29C 73/06 | (2006.01) |
| B29C 73/10 | (2006.01) |
| B29C 41/46 | (2006.01) |
| B29C 43/02 | (2006.01) |
| B29C 43/32 | (2006.01) |
| B29C 51/00 | (2006.01) |
| B31B 1/60 | (2006.01) |
| B32B 37/00 | (2006.01) |
| B32B 17/00 | (2006.01) |
| C03C 27/00 | (2006.01) |
| B31C 1/00 | (2006.01) |
| B65H 81/00 | (2006.01) |
| B31D 3/02 | (2006.01) |
| B27N 3/18 | (2006.01) |
| B28B 3/00 | (2006.01) |
| B28B 3/02 | (2006.01) |
| A01J 25/12 | (2006.01) |
| A21C 3/00 | (2006.01) |
| A21C 11/00 | (2006.01) |
| A23G 1/20 | (2006.01) |
| A23G 3/00 | (2006.01) |
| A23P 1/00 | (2006.01) |
| B28B 11/08 | (2006.01) |
| B28B 21/96 | (2006.01) |
| B28B 21/98 | (2006.01) |
| B28B 15/00 | (2006.01) |
| B29C 35/00 | (2006.01) |
| B29C 35/02 | (2006.01) |
| B29C 67/00 | (2006.01) |

(52) U.S. Cl. .......... 156/285; 156/60; 156/104; 156/381; 156/184; 156/162; 156/171; 156/443; 156/197; 264/319; 425/383; 425/387.1; 425/388; 425/389; 425/390

(58) Field of Classification Search .................. 156/285, 156/60, 104, 381, 184, 162, 171, 443, 197; 264/319; 425/387.1–390
See application file for complete search history.

(56) References Cited

U.S. PATENT DOCUMENTS 5,123,985 A 6/1992 Evans et al.
(Continued)

OTHER PUBLICATIONS

Office Action issued on Aug. 1, 2011 in related U.S. Appl. No. 12/779,706, 18 pages.

*Primary Examiner* — Khanh P Nguyen
*Assistant Examiner* — Matthew Hoover
(74) *Attorney, Agent, or Firm* — Lathrop & Gage LLP (57) ABSTRACT

A process for bonding a vented hollow component includes placing a preformed component with an aircraft skin on a tool surface, with bonding agent applied between the component and the skin. A vacuum bag is sealed about a vent in the preformed component. The vent may be formed through the vacuum bag and the component, or the vent may be preexisting (i.e., an open end of the preformed component or an aperture through the component). The vacuum bag is sealed to the tool surface with a temporary seal or adhesive, to enclose the preformed component and the skin. A vacuum is applied within the bagging material, to compress the preformed component with the aircraft skin, and the bagged assembly is autoclaved to cure the bonding agent. The vent in the preformed component facilitates pressure equalization within and outside of the component to enhance compression against the aircraft skin.

14 Claims, 7 Drawing Sheets

U.S. PATENT DOCUMENTS

| | | |
|---|---|---|
| 5,368,807 A | 11/1994 | Lindsay |
| 5,604,010 A | 2/1997 | Hartz et al. |
| 5,707,576 A * | 1/1998 | Asher .......................... 264/258 |
| 6,458,309 B1 * | 10/2002 | Allen et al. ................... 264/319 |
| 6,589,472 B1 | 7/2003 | Benson et al. |
| 6,632,502 B1 * | 10/2003 | Allen et al. ................... 428/119 |
| 7,993,479 B2 * | 8/2011 | Sander et al. ................ 156/285 |
| 2003/0168555 A1 * | 9/2003 | Livi et al. ..................... 244/132 |
| 2004/0115299 A1 | 6/2004 | Potter et al. |
| 2005/0183818 A1 | 8/2005 | Zenkner et al. |
| 2006/0006599 A1 | 1/2006 | Shahidi et al. |
| 2006/0049552 A1 | 3/2006 | Fish |
| 2008/0083494 A1 | 4/2008 | Samder et al. |

* cited by examiner

PROCESS FOR BONDING A VENTED HOLLOW COMPONENT

CROSS-REFERENCE TO RELATED APPLICATIONS

This application is a continuation of U.S. patent application Ser. No. 12/779,762, filed May 13, 2010 now abandoned, the disclosure of which is incorporated herein by reference. This application is also related to commonly-owned and copending U.S. patent application Ser. Nos. 12/779,744, filed May 13, 2010 and entitled "Process for Fabricating Aircraft Parts Using an Integrated Form," and 12/779,706, filed May 13, 2010 and entitled "Process for Bonding Components to a Surface." The disclosures of both related applications are incorporated herein by reference.

FIELD

This invention relates to the fabrication of advanced composite aerostructure articles.

BACKGROUND

Demand for strong, lightweight aircraft has led to widespread fabrication of aircraft parts from composite materials. Composite structures typically include inner and outer composite skins, with a core (e.g., a honeycomb core material) or stiffening member therebetween. These structures are commonly bonded via multiple curings in an autoclave. For example, the inner and outer skins may be separately pre-cured in an autoclave, then assembled with adhesive, a honeycomb aluminum or non-metallic core and uncured closure plies into a sandwich panel. The sandwich panel is cured once to cure the closure plies, and then vacuum bagged to a composite bond jig and again cured in an autoclave.

Co-curing methods have been introduced in an attempt to reduce the steps, man hours and expense involved in the above process. In co-curing, composite skins laid-up with adhesive and a honeycomb core are cured in a single cycle in the autoclave. However, strength is lost in co-curing due to dimpling of the composite plies inward, with nothing but the cell walls to compact the composite skins. Additional plies may be added, but they add weight and cost to the finished part. Additional problems inherent to honeycomb core elements are described in U.S. Pat. No. 5,604,010 to Hartz et al., and U.S. Pat. Nos. 6,632,502 and 6,458,309, both issued to Allen et al. The above-mentioned Allen patents discuss use of an internal air bag to counterbalance autoclave pressure during a single stage curing method. An internal air bag is placed inside a hollow, open-ended, stiffened graphite fabric mandrel that becomes an integral part of a finished aerostructure article. The lay-up (i.e., mandrel, bag, uncured composite layers and plies) is cured in an autoclave. Similarly, U.S. Patent Application Publication No. 2006/0006599 by Shahidi et al. describes a device that fits to a mold tool where an inflatable body with a pressurizable seal exits from the mold tool. When the body is inflated, the device prevents distortion and excess inflation of the pressurizable seal so that vacuum conditions can be applied there around.

As an alternative to inflatable mandrels, removable, rigid mandrels may be inserted within a prepreg lay up prior to autoclaving. The mandrels support the layup under autoclave pressures, and are removed from the final, cured product. For example, U.S. Pat. No. 6,589,472, issued to Benson et al., describes a combination tool/vacuum bag for compressing inner surfaces of composite parts. Composite parts, joints and webs are laid up around the tool/vacuum bag, and a separate, external vacuum bag is sealed to the assembly. Under vacuum pressure, the combination tool/vacuum bag expands outward to compress inner surfaces of the composite parts. After autoclaving, the assembly is reheated to soften and collapse the combination tool/vacuum bag, so that it can be removed.

Other techniques used in vacuum-bagging/bonding processes include placement of cushioning material between a layup and a vacuum bag, and using a vacuum bag, sealed to an edge of a component, in resin transfer molding. For example, U.S. Patent Application Publication No. 2005/0183818 by Zenker et al. suggests placement of an elastomeric caul beneath vacuum bagging material that is taped to a lay-up mandrel. The caul is stretched as negative pressure is applied, to draw the caul tightly against a composite component. Placing the caul between the component and the bagging material reduces wrinkling and deformation of the composite component by the bagging material. U.S. Patent Application Publication No. 2006/0049552 by Fish et al. describes vacuum assisted resin transfer molding for making a bond line between components. A vacuum bag is sealed against the edges of a component being bonded, and a vacuum is applied to draw injected resin through a flow path between the components.

SUMMARY

In one embodiment, a process for bonding a vented hollow component includes placing a hollow form with a preformed component and applying a bonding agent to the preformed component at an intended contact point with at least one section of laminate. The laminate section is assembled about the hollow form and in contact with the bonding agent on the preformed component, such that the laminate covers at least a portion of the hollow form and the preformed component. Vacuum bagging material is placed about the laminate assembly and the form, and sealed to the preformed component and about a vent in the form, to enclose the laminate assembly in the bagging material. A vacuum is applied within the bagging material, to compress the at least one section of laminate to the preformed component and about the form. The bagged laminate, preformed component and vented form are autoclaved, to cure the bonding agent and form a final composite laminate product.

In one embodiment, a process for bonding a vented hollow component includes the steps of applying a bonding agent to a preformed component at an intended contact point with a first base section of laminate, and placing the first base section of laminate with the preformed component, in contact with at least a portion of the bonding agent. A hollow form is placed on or contacting the first base section of laminate; and bonding agent is applied to the first base section of laminate at an intended contact point with a first upper section of laminate. The first upper section of laminate is assembled about the hollow form and in contact with the bonding agent on the first base section of laminate, such that the laminate covers at least a portion of the hollow form and the first base section of laminate. Vacuum bagging material is placed about the first upper base and upper sections and the form; and the material is sealed to the preformed component and about a vent in the form, to enclose the laminate in the bagging material. A vacuum is applied within the bagging material, to compress the first upper and base laminate sections together and about the form, and to compress the base laminate section to the preformed component. The laminate assembly is autoclaved with the preformed component and the hollow form, to cure the bonding agent and form a final composite laminate product. The vent facilitates equalization of pressure inside and outside of the hollow form, to prevent deformation of the form under autoclave pressures.

In one embodiment, a process for bonding a vented hollow component includes placing at least one base laminate section on a preformed component and in contact with bonding agent on the preformed component, and placing a hollow vented form on the base section. Bonding agent is selectively applied to the base section, and at least one upper laminate section is placed about the form and in contact with the bonding agent, leaving the form vent clear. A vacuum bag is sealed around the form vent and to the preformed component to enclose the base and upper sections while maintaining an airway through the form vent. A vacuum is applied within the vacuum bag to compress the base and upper sections together about the form and to the preformed component, to bond the base and upper sections together and with the preformed component. The bagged base and upper sections and form are autoclaved with the preformed component to cure the bonding agent and form a composite laminate product; the vented form comprising a permanent part of the composite laminate product.

In one embodiment, a process for bonding a vented hollow component includes placing an aircraft structure on a tool surface and applying a bonding agent to the aircraft structure, at an intended junction point with a preformed, vented hollow component. The preformed, vented hollow component is placed on the aircraft structure and in contact with the bonding agent, and covering with a vacuum bag. The vacuum bag is sealed to a vent in the preformed component and to the aircraft structure, such that the preformed component is enclosed in the vacuum bag. A vacuum is applied within the vacuum bag, to compress the preformed component to the aircraft structure, to bond the preformed component with the aircraft structure; and the bagged preformed component and the aircraft structure are autoclaved on the tool surface, to cure the bonding agent and form a composite laminate product.

DETAILED DESCRIPTION

Figure 1A:
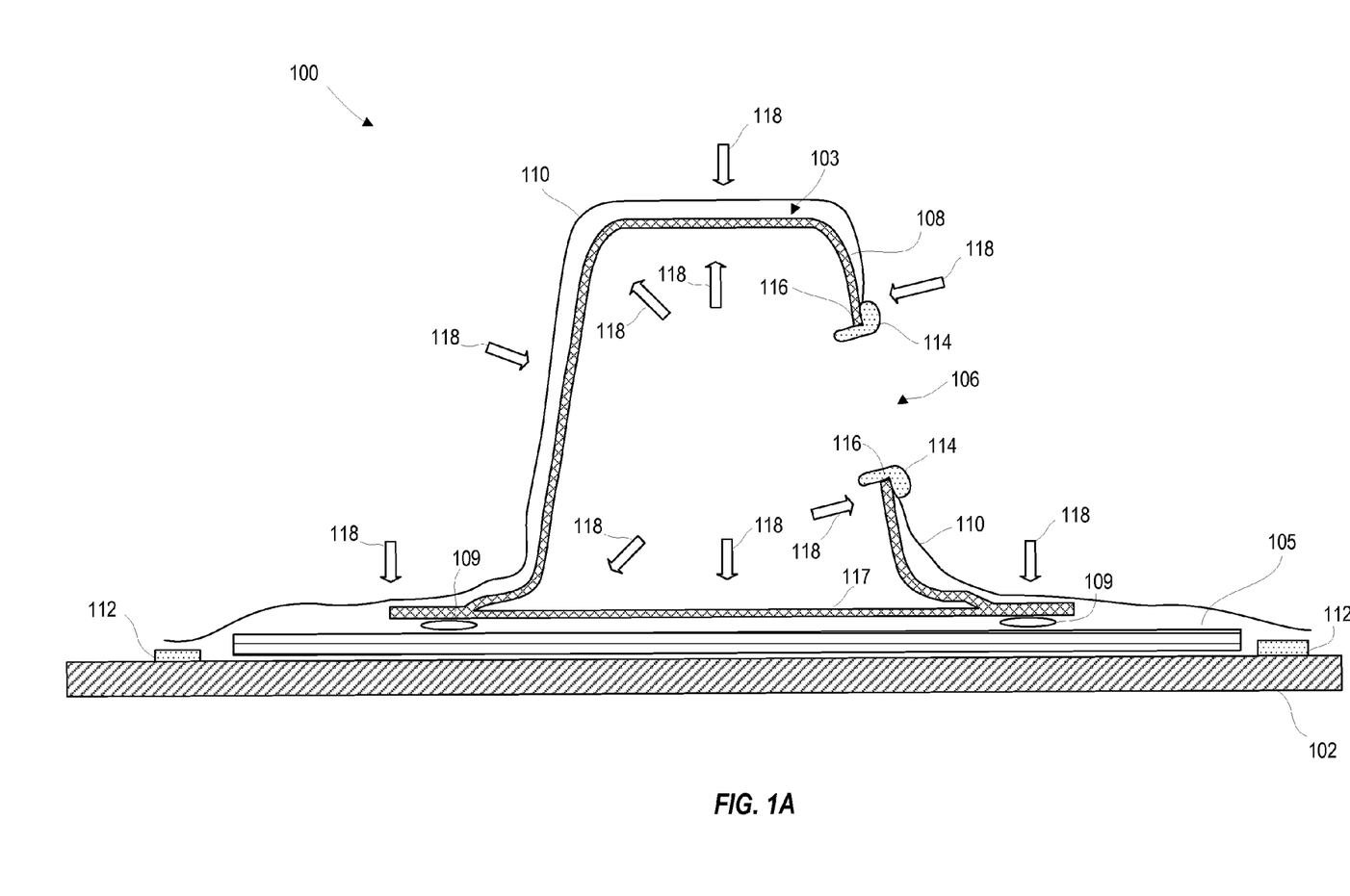
FIG. 1A is a schematic cross-sectional view through a prepreg layup including a preformed component on an aircraft skin.
Figure 1B:
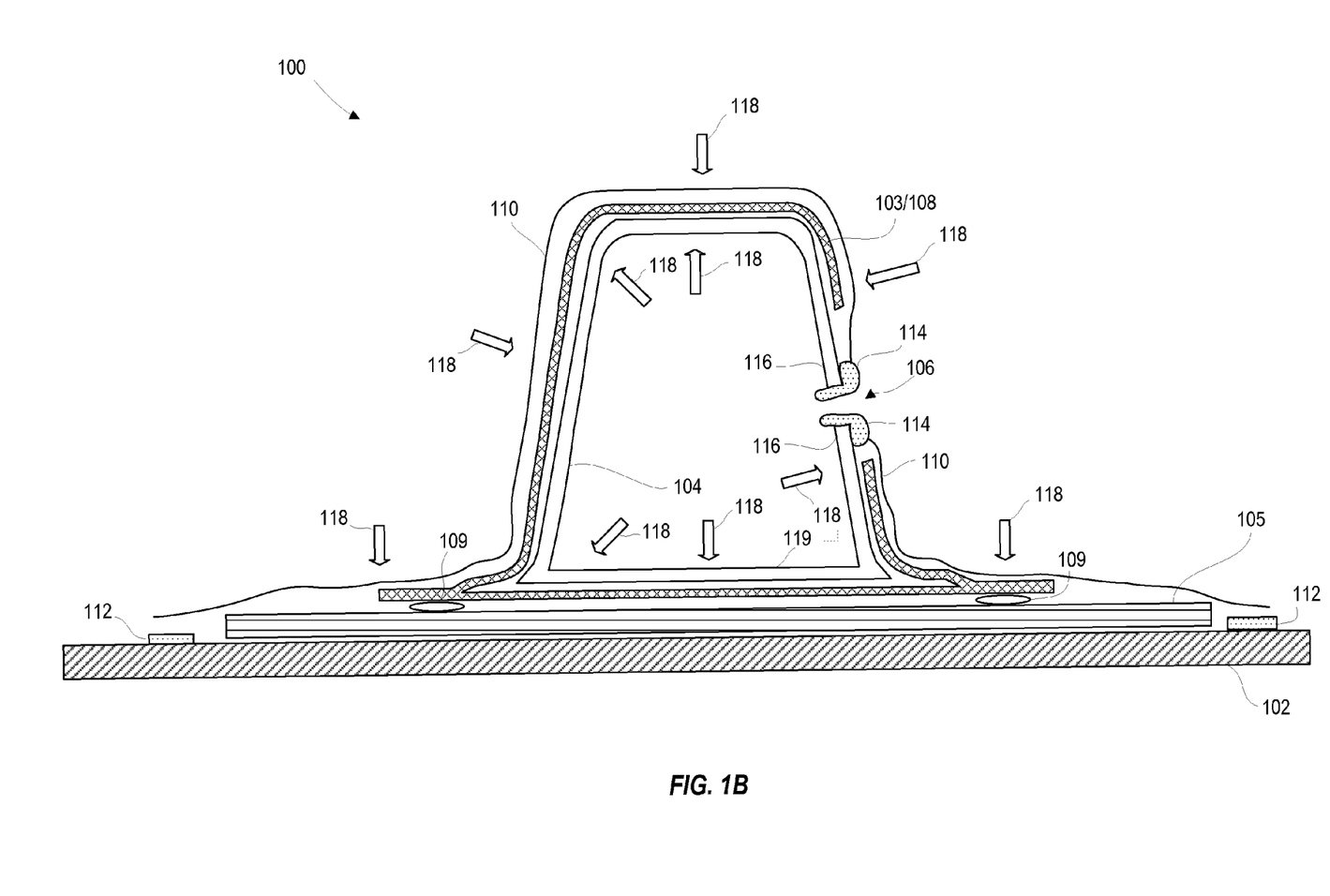
FIG. 1B is another cross-sectional view through the layup of FIG. 1A, showing an integrated form configured with the preformed component.

FIG. 1A is a schematic cross-sectional view through a prepreg layup 100, on a tool surface 102. Layup 100 includes a preformed component 103, shown in FIG. 1A as a vented hat structure, which may be formed as described in related patent application Ser. No. 12/779,744, filed May 13, 2010 and entitled "Process for Fabricating Aircraft Parts Using an Integrated Form." When formed as described in said patent application, preformed component 103 may include an integrated form 104, as shown in FIG. 1B, described below.

Preformed component 103 includes a vent 106 therethrough, for allowing introduction of pressure-equalizing air within component 103. Vent 106 is for example a round or otherwise shaped aperture in composite laminate 108 that forms component 103, for introducing autoclave pressure (see arrows 118) inside layup 100 (i.e., within component 103). Layup 100 is thus subjected to the same pressure inside and outside of component 103, which prevents collapse of composite laminate 108 under pressure. Where preformed component 103 is open-ended (i.e., where preformed component 103 is a longitudinal stringer), an open end of component 103 may serve as vent 106. See, for example, FIG. 2, described below.

Figure 3:
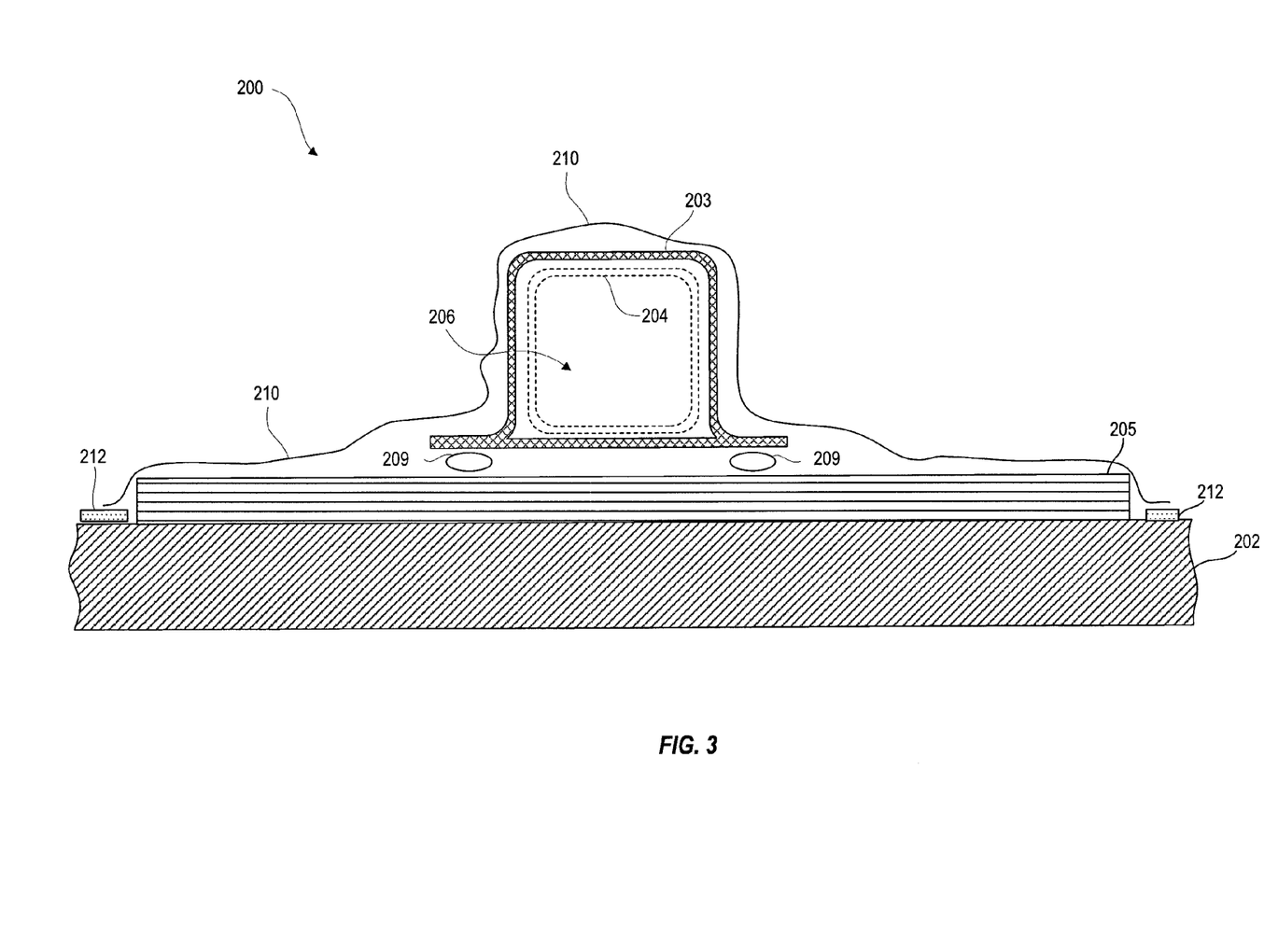
FIG. 3 is a cross-sectional view showing an integrated form in the open-ended preformed component of FIG. 2.
Figure 4:
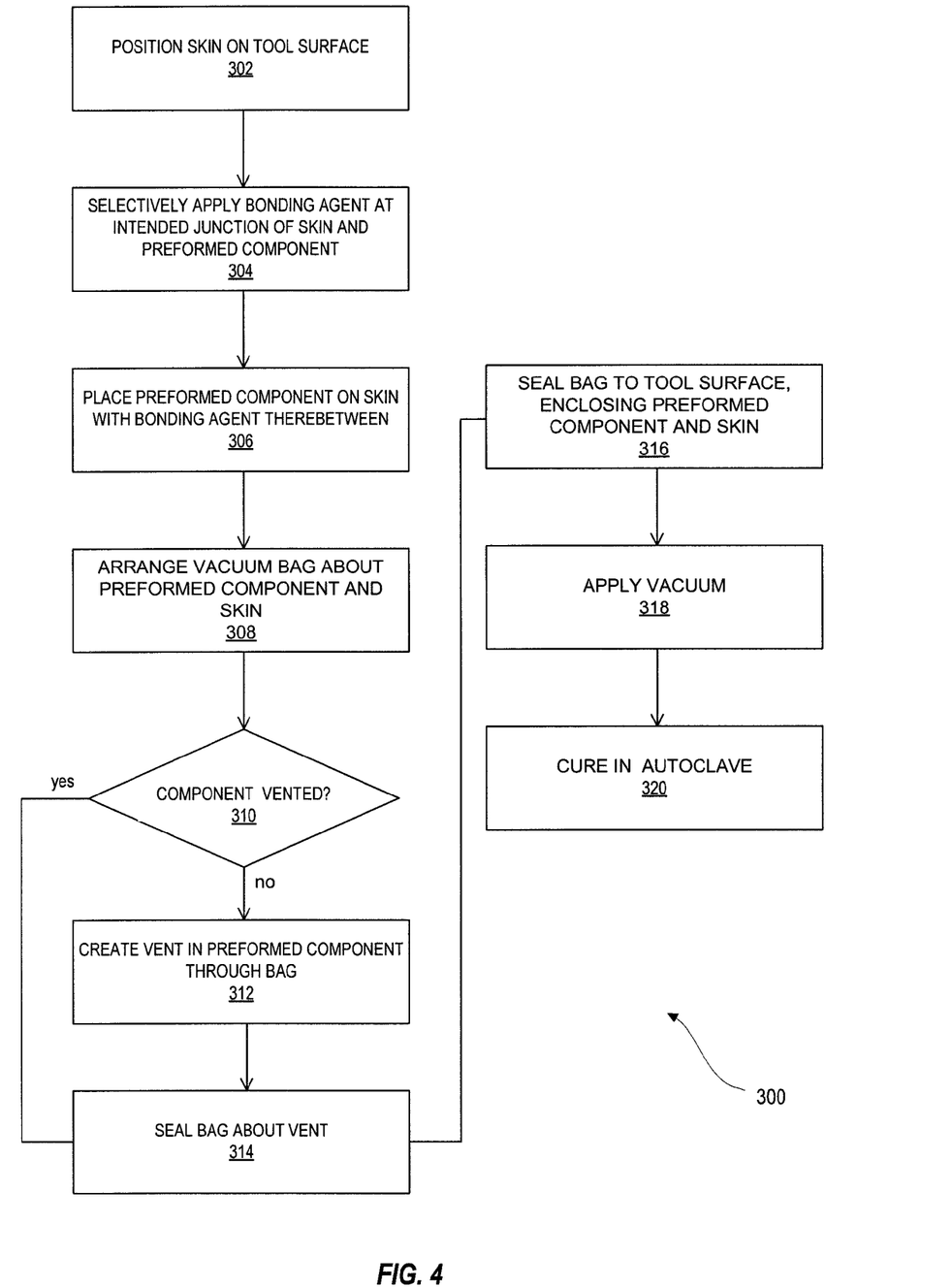
FIG. 4 is a flowchart illustrating a process 300 for bonding a preformed component with an aircraft skin.

Composite laminate 108 is arranged about form 104. Composite laminate 108 is shown in FIG. 1A as a single piece of laminate, or a laminate structure that has already been preliminarily bonded about form 104 (i.e., glued together but not yet bonded in an autoclave); however, it will be appreciated that composite laminate 108 may include multiple pre-bonded or un-bonded sections, as shown in FIGS. 1B, 3 and 4, described below.

In one aspect, a composite skin 105 is placed upon tool surface 102. A bonding agent 109 may be selectively applied between to skin 105 at an intended contact point with preformed component 103. Preformed component 103 is placed upon skin 105 such that bonding agent 109 bonds skin 105 and composite laminate 108 of preformed component 103 together. A vacuum bag 110 is arranged over preformed component 103 and skin 105, and sealed to tool surface 102 with a temporary adhesive or seal 112. Temporary seal 112 is for example single or double-sided sealing tape. Vacuum bag 110 is arranged such that preformed component 103 and skin 105 are completely enclosed therein.

A form-bag seal or seals 114 (not drawn to scale) seal vacuum bag 110 around a rim or open edge/edges 116 of vent 106. The inside of preformed component 103 thus remains open to the outside environment, via vent 106. Vacuum bag 110 may be positioned about preformed component 103 such that a pre-existing bag opening aligns with and is sealed to a pre-existing vent 106. Alternately, vent 106 is formed through bag 110 and preformed component 103 after bag placement. Vacuum bag 110 is then sealed to preformed component 103 via form-bag seal(s) 114 at rim 116 of newly-formed vent 106. It will be appreciated that vacuum bag 110, temporary seal(s) 112 and form-bag seal(s) 114 are removed after curing, and are not integral to the finished part.

In typical autoclave curing, parts are bagged and placed in the autoclave under a vacuum. The autoclave is then closed and allowed to pressurize. At a predetermined pressure (e.g., in excess of 15 psi), the vacuum connection is opened to outside air pressure (normal atmospheric pressure outside the autoclave). As long as the autoclave pressure is higher than the outside air pressure, gas expelled from the lamination during cure will exit. As long as the vacuum bag remains intact, the autoclave pressurizes the laminate by pressurizing the vacuum bag (i.e., autoclave conditions transfer pressure to the laminate by pushing on the vacuum bag). An inflatable form or a removable, rigid form (e.g., mandrel) is used to prevent the composite from collapsing inward.

Vented preformed component 103 eliminates the need for a rigid or inflatable mandrel. Vent 106 allows equalization of pressure within and outside of preformed component 103, such that component 103 is subjected to net zero pressure even while curing pressure is applied, except at a bottom 117 of component 103, where autoclave pressure encourages bonding and curing between component 103 and skin 105. In other words, autoclave pressure acts from inside and outside of preformed component 103 simultaneously; pressing outward on component 103 from within while also applying inward pressure to the outside of component 103 (via vacuum bag 110), as indicated by pressure arrows 118. Curing pressure is thus supplied and component 103 is pressed to and cured with skin 105 without collapsing component 103.

In an embodiment shown in FIG. 1B, preformed component 103 includes an integrated form 104. Form 104 is for example made of a lightweight but relatively stiff material, such as a paper mandrel or other insert. Form 104 may alternately be fabricated from materials including thin plastic or metal, or any other relatively lightweight and stiff material. Form 104 provides structural support for a prepreg layup placed there around (e.g., composite laminate 108 forming component 103), and defines an air sealed chamber which, when vented, provides equal counterbalancing pressure necessary to prevent the layup and form 104 from being crushed by autoclave pressures. Form 104 is not removed from final component 103 formed by the layup; but rather becomes an integral part of component 103. Because form 104 is made of paper or another lightweight material, it contributes little weight to final component 103. The potential for damage to final component 103 is also reduced, since component 103 need not be tampered with to remove form 104. Vented form 104 can be produced at low cost, and further reduces manufacturing costs (compared to conventional shaping and curing methods) by eliminating additional tooling and/or core materials (e.g., inflatable mandrels). Use of vented form 104 additionally facilitates single stage cures, reducing or eliminating secondary bonding and associated labor costs. Vented form 104 also facilitates formation of devices with small inside spaces (such as stringers) that are incompatible with conventional mandrels.

As shown in FIG. 1B, form-bag seal(s) 114 may be applied to hold vacuum bag 110 to form 104, rather than to component 103, so long as component 103 is completely covered by vacuum bag 110. Under autoclave conditions, form 104 is pressed out from within, as laminate 108 of component 103 is pressed in from without, as shown by pressure arrows 118. This results in net zero force on component 103, except at a bottom 119 of the form 104/component 103 layup, where component 103 is pushed to skin 105 via form 104.

Figure 2:
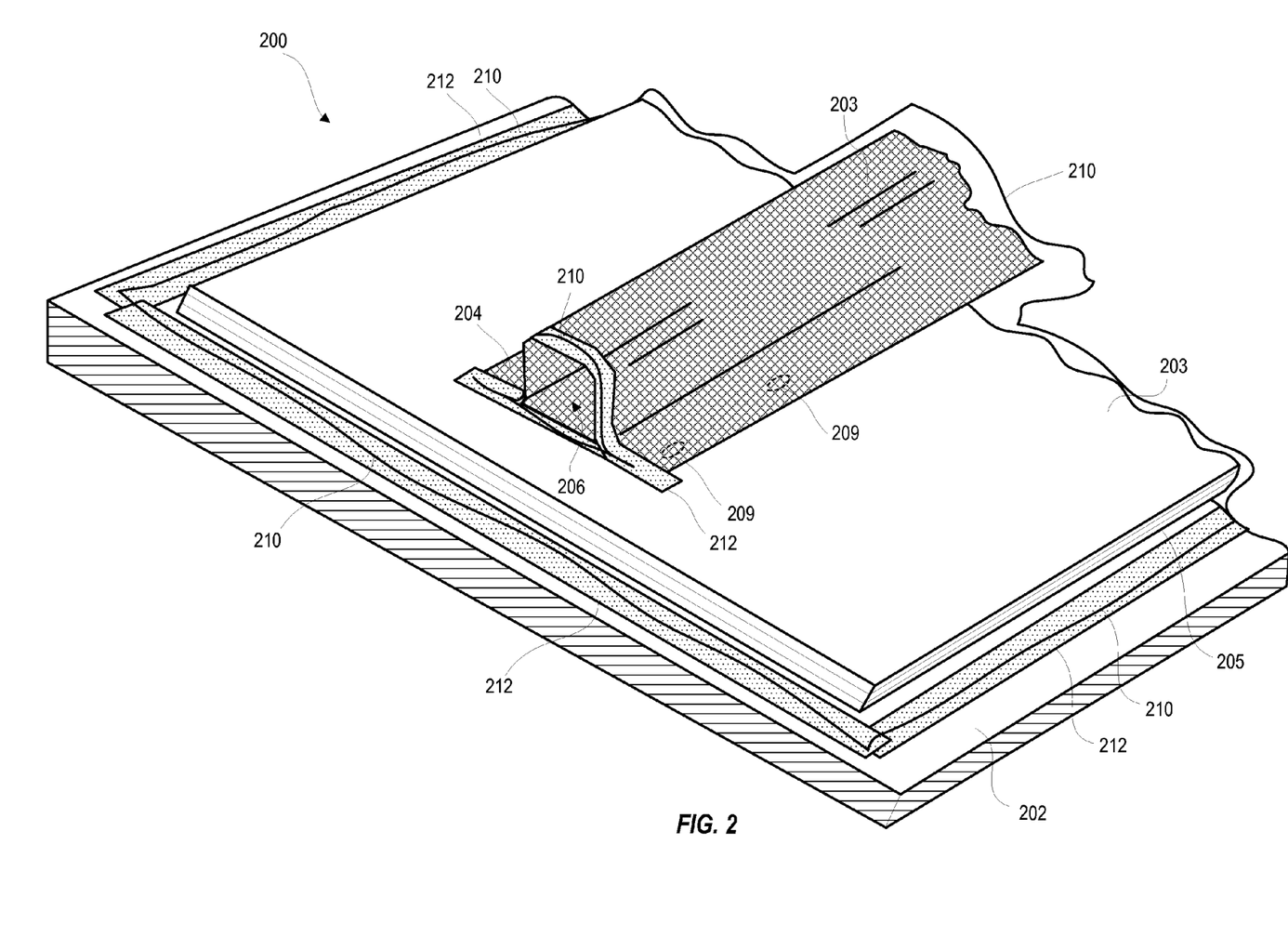
FIG. 2 is a partial perspective view showing an open-ended preformed component arranged for bonding with an aircraft skin.

FIG. 2 is a partial perspective view of a prepreg layup 200, including a preformed component 203 on a skin 205, supported by a tool surface 202. Preformed component 203 is shown as a longitudinal stringer including a floor (not shown) and at least one open end 206, serving as a vent. Since at least one end of component 203 is open, no other vent may be needed. Component 203 is for example formed of composite laminate, such as laminate 108, shown in FIGS. 1A and 1B. It will be appreciated that the preformed components (e.g., 103/203) described herein may take the form of a hat, a longitudinal stringer or other structures.

A bonding agent 209 (shown as dashed ovals) may be placed on skin 205 at one or more intended contact points with preformed component 203. A vacuum bag 210 is placed about preformed component and sealed to component 203 at open end/vent 206. A temporary adhesive or seal 212, which is for example a tape, seals vacuum bag 210 around preformed component 203. Temporary seal 212 is also shown sealing vacuum bag 210 about open end/vent 206; however, a form-bag seal similar to seal 114 may alternately be used to secure bag 210 about open end/vent 206. When autoclaved, open end/vent 206 allows equal pressurization inside and outside of preformed component 203, to prevent collapse of component 203 walls during autoclave curing.

FIG. 3 is a partial side view of prepreg layup 200 of FIG. 2. Preformed component 203 is placed on skin 205 and in contact with bonding agent 209 placed thereon. Alternately, bonding agent 209 is applied to a bottom surface of component 209 prior to component 203 placement on skin 205. As shown in FIG. 2, component 203 may include an integrated form 204 (illustrated by a dashed line), for example, an open-ended, hollow tube of paper, lightweight plastic or another lightweight material, for supporting a longitudinal stringer. Form 204 may be formed with component 203 as described in U.S. Ser. No. 12/779,744. If form 204 extends from open end/vent 206, vacuum bag 110 may be sealed to the open end of integrated form 204, so long as laminate or other material forming preformed component 203 is enclosed in vacuum bag 210. Otherwise, vacuum bag 210 is sealed about open end/vent 206, e.g., via a form-bag seal or seals 214 (similar to seal 114), or using temporary seal 212 (e.g., a single or double-sided tape). Bag 210 covers preformed component 203 and skin 205, with vent 206 open, such that bag 210 transfers autoclave pressure to compress component 203 to skin 205, while vent 206 allows pressurization within component 203, to prevent inward movement due to autoclave pressure.

FIG. 4 is a flowchart depicting a method 300 of bonding a preformed component with an aircraft skin. The skin is placed on a tool surface, in step 302. Bonding agent is selectively applied to an intended junction point of the skin and a preformed component, in step 304, and the preformed component is placed on the skin, with the bonding agent between the skin and the component, in step 306. In one aspect, bonding agent is applied to the skin at one or more receiving points for the preformed component. In another aspect, bonding agent is applied to the preformed component prior to its placement on the skin.

Vacuum bagging material is arranged about the preformed component and skin, in step 308. If the component is vented (decision 310), the vacuum bag material is sealed about the vent, in step 314. The vacuum bag may have an existing opening for sealing about the vent, or an opening may be created through the bag and at the vent area, once the bag is in place over the preformed component.

If the component is not vented (decision 310), a vent is created in the preformed component and through the bag, in step 312, and then the bag is sealed about the vent, in step 314. The vacuum bag material is sealed to the skin such that the preformed component is enclosed in the bag, in step 316. A vacuum is applied in step 318, and the assembly is cured in an autoclave, in step 320.

In one example of steps 302-320, skin 105 is placed upon tool surface 102. Bonding agent 109 is applied to one or more intended contact points between skin 105 and preformed component 103. Bonding agent 109 may be applied to intended contact points on skin 105, component 103 or both. Vacuum bag 110 is arranged about preformed component 103 and skin 105, in step 308. If component 103 was previously vented, i.e., having an existing vent 106 (decision 310), vacuum bag 110 is sealed about vent 106 using one or more form-bag seals 114. If component 103 was not previously vented, vent 106 is created in component 103, for example through overlying vacuum bag 110, in step 312, and vacuum bag 110 is sealed to vent 106, in step 314.

After sealing vacuum bag 110 to vent 106, vacuum bag 110 is sealed to tool surface 102 with temporary seal 112, enclosing component 103 and skin 105 (step 316). Temporary seal 112 may be a single or double-sided tape, or a glue.

Once vacuum bag 110 is sealed to the preformed component 103 (at vent 106) and to tool surface 102, a vacuum is applied within sealed bag 110, in step 318, and the assembly is cured in an autoclave, in step 320. For example, the assembly may be placed in an autoclave with a vacuum connection to bag 110, and a vacuum may be applied within bag 110 to compress preformed component 103 to skin 105, allowing bonding agent 109 to bond skin 105 and component 103. Once a predetermined autoclave pressure is reached, the vacuum connection is opened, and autoclave pressure is transferred to component 103 and skin 105, via bag 110, to maintain and/or augment compression of preformed component 103 with skin 105 while bonding agent 109 cures. Vent 106 allows pressure equalization within and outside of component 103, preventing collapse or deformation of the form during compression via bag 110.

In another example of steps 302-320, skin 205 is placed on tool surface 202. Bonding agent 209 is placed at intended contact points between skin 205 and preformed component 203. For example, bonding agent is placed at intended contact points on skin 205, component 203 or both. Preformed component 203 is placed on skin 205, with bonding agent 209 in between. Vacuum bag 210 is arranged about preformed component 203, to cover component 203 and skin 205.

Component 203 is an open-ended structure; therefore, the open end serves as vent 206 (decision 310). Vacuum bag 210 is thus sealed about vent 206, in step 314. Bag 210 is sealed to tool surface 102, enclosing component 203 and skin 205, in step 316, and a vacuum is applied within bag 210, in step 318. The assembly is autoclaved, in step 320.

Figure 5:
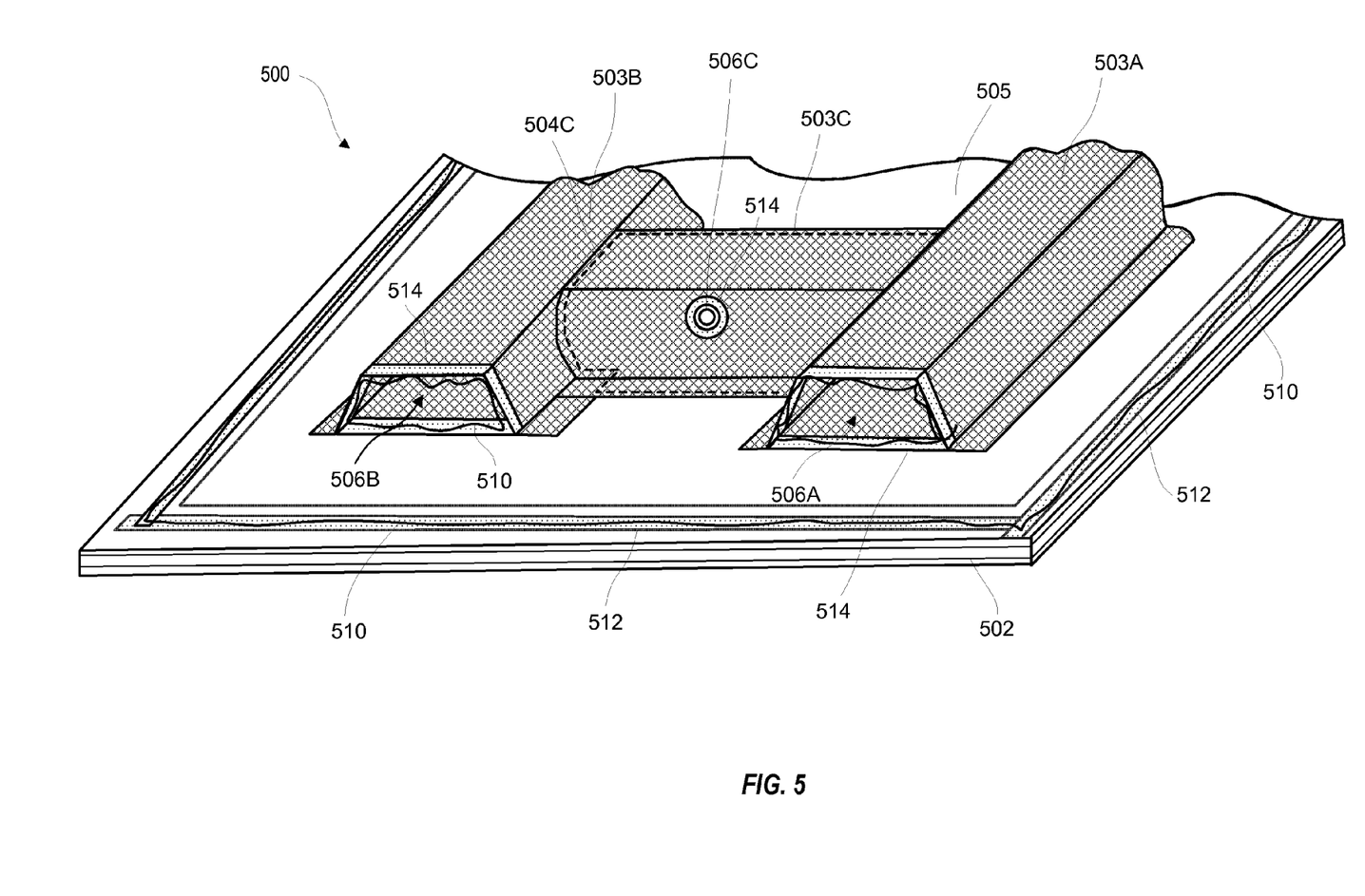
FIG. 5 is a partial perspective view showing a multi-section preformed component arranged for bonding with an aircraft skin.

FIG. 5 depicts a prepreg layup 500 including a multi-part preformed component 503 having sections 503A, 503B and 503C. Sections 503A and 503B are for example pre-formed longitudinal stringers with a cross-stringer 503C therebetween. A bonding material such as material 109 (not shown) fixes preformed component 503 to skin 505, shown on a tool surface 502.

Vacuum bagging material 510 is applied over preformed component 503 and sealed at vents 506A, 506B and 506C. In the example of FIG. 5, longitudinal stringer sections 503A and 503B have open ends serving as vents 506A and 506B. Cross-stringer section 503C has no open end, thus, vent 506C may be formed in section 503C, through bag 510, or section 503C may have a pre-existing vent 506C, for example when sections 503A-C were bonded and cured together in a one-step curing method as described in U.S. Ser. No. 12/779,744. One or more of component 503 sections 503A-C may include an integral hollow form, for example form 504C, indicated by a dashed line. Vents 506 extend through any integrated forms in component 503.

Vacuum bag 510 is sealed about vents 506 using form-bag seals 514 (e.g., double or single-sided tape, foam tape or glue). Vacuum bag 510 is sealed to tool surface 502 via temporary adhesive or seals 512, such that preformed component 503 and skin 505 are enclosed in bag 510.

Once vacuum bag 510 is affixed in place, a vacuum may be applied within the bag, and autoclaving may be performed as described with respect to FIG. 4, above. Vents 506 allow pressurization within preformed component 503, transferring vacuum and autoclave pressure to inner floors of component 503, enhancing contact between bottom surfaces of component 503 and a facing surface of skin 505.

Figure 6:
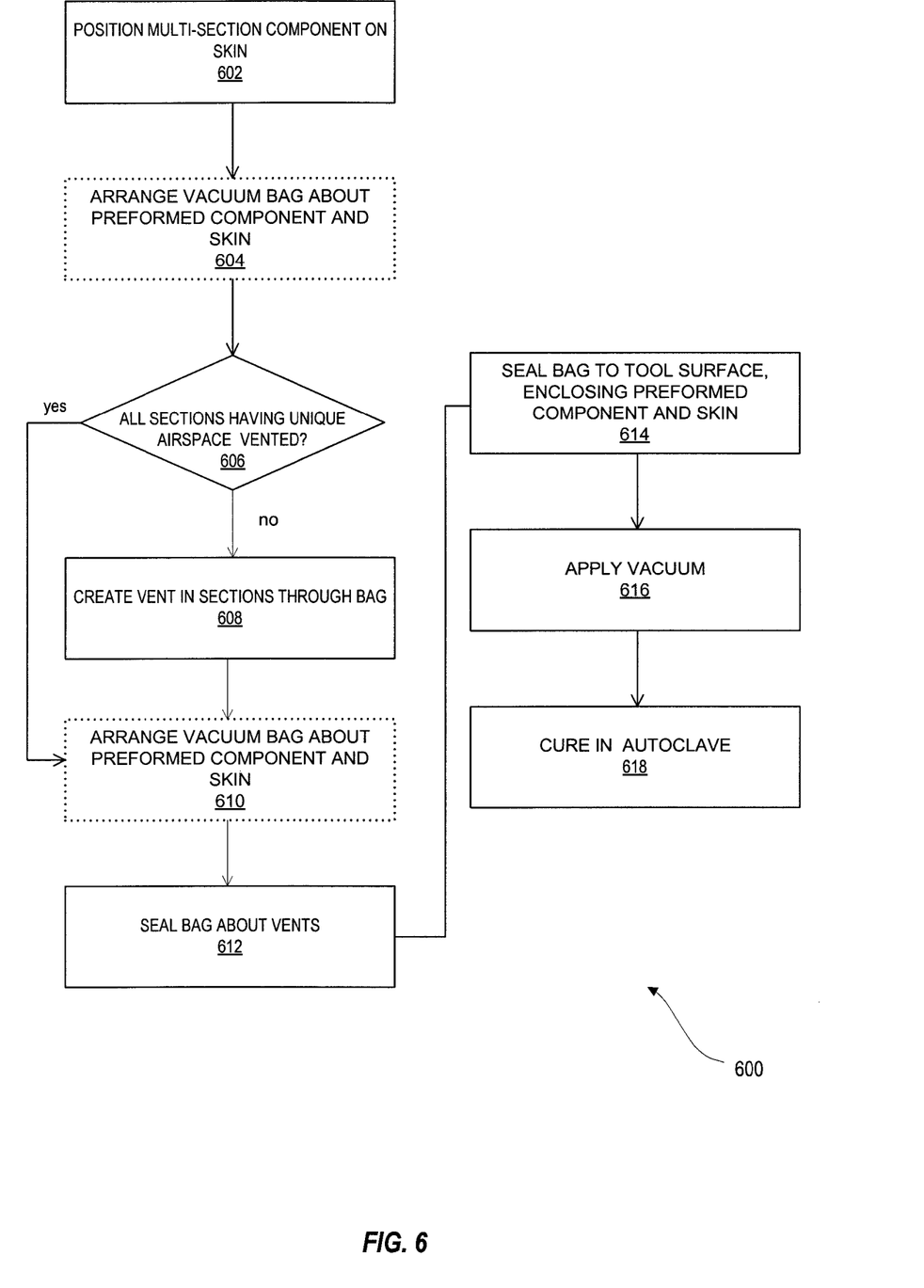
FIG. 6 is a flowchart illustrating a process for bonding a multi-section preformed component with an aircraft skin.

FIG. 6 depicts a process 600 of bonding a multi-sectioned pre-formed component with an aircraft skin. Before describing each step, it is noted that steps 604 and 610 are depicted as dotted boxes, to indicate that the described action may occur at the position occupied by either dotted box.

In step 602, a multi-section preformed component, such as component 503, is placed on an aircraft skin such as skin 505 (e.g., on a tool surface), with a bonding agent between the skin and the component. The skin may be supported by a tool surface such as tool surface 505, FIG. 5. A vacuum bag, e.g., bag 510, may be arranged about the multi-section component and supporting skin, in step 604 (e.g., if vents are to be created through the bag), or later, at step 610). If all sections of the component that have their own airspace are not vented (decision 606), then vents in previously un-vented sections may be created through bag 510, in step 608. In one example of step 608, section 503C is vented through vacuum bag 510.

If all sections having unshared airspace (unshared with another section) are vented (decision 606), the vacuum bag is arranged about the preformed component and skin, in step 610 (if not already performed at step 604).

Once the vacuum bag is in place, it is sealed about all vents in the preformed component, in step 612. In one example of step 612, vacuum bag 510 is sealed about open ends/vents 506A and 506B, and about vent 506C, using form-bag seals 514. Optionally, temporary adhesive 512 may be used in place of or in addition to form-bag seals 514.

The vacuum bag is sealed to the tool surface, enclosing the preformed component and aircraft skin, in step 614. For example, bag 510 is sealed to tool surface 502 to enclose multi-section preformed component 503 and skin 505 therein. It will be appreciated that the vacuum bag may alternately be sealed to the tool surface prior to sealing the bag to the form vents, e.g., when vents are formed through the bag.

Once the vacuum bag (e.g., bag 510) is sealed to the tool surface and to vents in the preformed component (e.g., tool surface 502 and vents 506A-C), a vacuum is applied within the bag, and the assembly is autoclave-cured, as described above.

It will be appreciated that the processes described above may be extended to bonding both composite laminate structures and metal or other structures with an aircraft skin, or to bonding one or more pre-formed components (e.g., two longitudinal stringers) with another preformed component (e.g., a cross-stringer), on a tool surface. Such adaptations are described further in co-pending U.S. patent application Ser. Nos. 12/779,744 and 12/779,706, respectively entitled "Process for Fabricating Aircraft Parts Using an Integrated Form" and "Process for Bonding Components to a Surface," the disclosures of which are incorporated herein by reference. It will be understood that certain changes may be made in the above systems and methods without departing from the scope hereof; thus, it is intended that all matter contained in the above description or shown in the accompanying drawings be interpreted as illustrative and not in a limiting sense. It is also to be understood that the following claims are to cover generic and specific features described herein, and all statements of the scope of the invention which, as a matter of language, might be said to fall there between.

What is claimed is:

1. Process for bonding a preformed component with an aircraft skin, comprising the steps of:
   positioning the aircraft skin with a tool surface;
   applying a bonding agent at one or more intended contact points between the skin and a preformed component;
   placing the preformed component with the aircraft skin, the bonding agent therebetween;
   arranging vacuum bagging material about the preformed component and the aircraft skin;
   sealing the vacuum bagging material about a vent in the preformed component;

sealing the vacuum bagging material to the tool surface to enclose the preformed component and the aircraft skin;

applying a vacuum within the bagging material, to compress the preformed component with the aircraft skin; and autoclaving the bagged preformed component with the aircraft skin such that the autoclave directly pressurizes the interior of the preformed component, to cure the bonding agent and bond the component with the aircraft skin;

wherein the preformed component remains free of any separate internal support during the bonding process.

2. Process of claim 1, the step of sealing the vacuum bagging material about a vent in the preformed component further comprising the step of creating an aperture through the vacuum bag and the preformed component, the aperture being the vent;

wherein sealing the vacuum bag about the vent comprises sealing the bag about a rim of the aperture, to maintain an airway through the preformed component.

3. Process of claim 1, the step of sealing the bag about a vent in the preformed component comprising sealing the bag around the vent with a form-bag seal.

4. Process of claim 1, the step of sealing the vacuum bagging material about a vent in the preformed component comprising sealing the vacuum bagging material to an open end of the preformed component.

5. Process of claim 1, the preformed component comprising one or more of a cross stringer and a longitudinal stringer.

6. Process of claim 1, wherein the vent facilitates equalization of pressure inside and outside of the component, to prevent deformation under autoclave pressures.

7. Process of claim 1, wherein the vent facilitates equalization of pressure inside and outside of the component, such that autoclave pressure is transferred to an inner floor of the component, to compress the component to the skin.

8. Process of claim 1, one or both of the steps of (a) sealing the vacuum bagging material about the form vent, and (b) sealing the vacuum bagging material to the tool surface, comprising using an adhesive selected from the group of single-sided tape, double-sided tape, foam tape and glue.

9. Process for bonding preformed component with an aircraft skin, comprising the steps of:

applying a bonding agent to one or both of the preformed component and the skin, at one or more intended contact points between the preformed component and the aircraft skin;

positioning the preformed component with the skin, the bonding agent therebetween;

placing vacuum bagging material about the preformed component and the skin;

creating a vent through the vacuum bagging material and the preformed component substantially simultaneously;

sealing the vacuum bagging material about the vent;

sealing the vacuum bagging material to a tool surface supporting the skin, to enclose the preformed component and the skin;

applying a vacuum within the bagging material, to compress the preformed component with the skin; and autoclaving the bagged assembly to directly pressurize the interior of the preformed component and to cure the bonding agent;

wherein the vent facilitates equalization of pressure inside and outside of the preformed-component, such that autoclave pressure is applied directly to an inner floor of the preformed component without an internal bag, to compress the preformed component against the skin.

10. Process of claim 9, one or both of the steps of (a) sealing the vacuum bagging material about the vent and (b) sealing the vacuum bagging material to the tool surface, comprising using an adhesive selected from the group of a single-sided tape, a double-sided tape, a foam tape and a glue.

11. Process for bonding a preformed component with an aircraft skin, comprising:

applying a bonding agent to one or both of the preformed component and the aircraft skin, at intended contact points between the preformed component and the skin;

positioning the preformed component with the skin, the bonding agent therebetween;

sealing a vacuum bag to an inner or outer rim of an open end vent of the preformed component;

sealing the vacuum bag to a tool surface supporting the aircraft skin, to enclose the preformed component and the aircraft skin in the vacuum bag, such that the interior of the preformed component remains free of internal support;

applying a vacuum within the vacuum bag, to compress the preformed component against the skin; and autoclaving the bagged assembly to directly pressurize the interior of the preformed component and to cure the bonding agent.

12. Process of claim 11, wherein the form open end vent facilitates equalization of pressure within and outside of the form, such that an inner floor of the preformed component is pressed against the aircraft skin.

13. Process of claim 11, the preformed component comprising a longitudinal stringer.

14. Process for bonding a preformed component with an aircraft skin, comprising:

applying a bonding agent to one or both of the preformed component and the aircraft skin, at intended contact points between the preformed component and the skin;

positioning the preformed component with the skin, the bonding agent therebetween;

arranging vacuum bagging material about the preformed component and the aircraft skin;

sealing the vacuum bagging material about a vent in the preformed component and to a tool surface supporting the aircraft skin, to enclose the preformed component and the aircraft skin in the vacuum bag;

applying a vacuum within the vacuum bag, to compress the preformed component against the skin; and autoclaving the bagged assembly to directly pressurize the interior of the preformed component and to cure the bonding agent.

* * * * *